3,270,775
DIVERTER VALVE ASSEMBLY
Edgar D. Alderson, Cincinnati, Ohio, assignor to General Electric Company, a corporation of New York
Filed Apr. 9, 1963, Ser. No. 271,721
6 Claims. (Cl. 137—609)

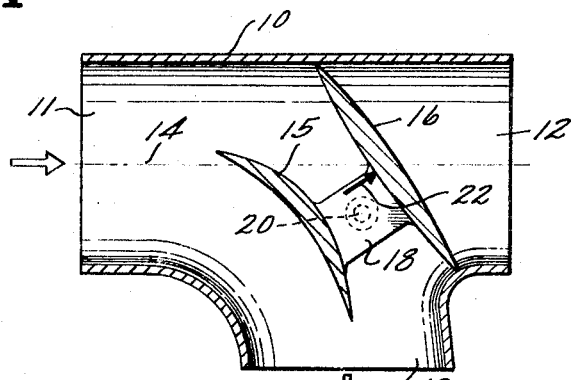
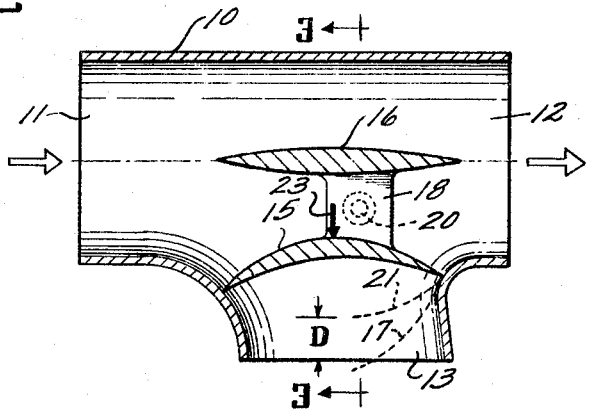
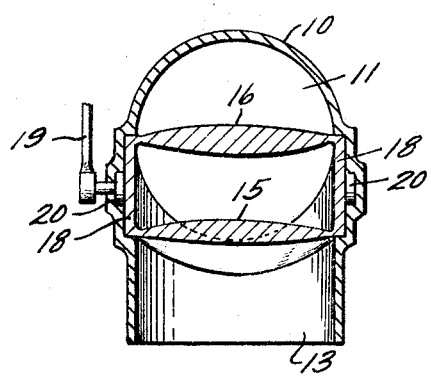

The present invention relates to a diverter valve assembly and, more particularly, to a unitary diverter valve such as may be used in a VTOL aircraft to selectively direct exhaust gases rearwardly and/or downwardly.

In VTOL aircraft of the diverted thrust and lift fan variety, it is customary to use diverter valves. In the diverted thrust type, a gas generator may exhaust rearwardly of an aircraft for forward thrust or the gas generator exhaust may be diverted through a conduit branch pipe downwardly in order to provide a vertical component on the aircraft for vertical lift. In the lift fan type, the gas generator may direct its exhaust gases rearwardly for forward thrust on the aircraft or may divert the exhaust gases through a conduit branch pipe to a tip turbine fan in a portion of the aircraft such as a wing, which fan provides vertical lift on the aircraft. In either case, a diverter valve is required at the conduit branch to direct the exhaust gases in one direction or the other.

A common valve that has been employed for these purposes is a double butterfly valve consisting of separate butterfly doors externally linked to provide closure of the alternate conduits from the diverter valve. The spaced valve doors are connected to turn together so that the outlets from the conduit are alternately opened and closed. A conventional valve structure of this type as applied to a lift fan system is shown in U.S. Patent 2,939,649 to R. A. Shaw and as applied to a diverted thrust system in U.S. Patent 2,947,499 to A. Douglas. Because of the separate door structure with external linkage and the pivot arrangement of the conventional structure, it will be apparent that a somewhat complex linkage is required to operate the valve doors and they operate about a pivot generally through the center of the door. Furthermore, actuator force alone has been used to hold the valve doors in either end position of their travel. Consequently, loss of actuator pressure or failure of the linkage will permit the valve doors to move. In addition, the pivoting arrangement has required a depth of structure at the diverter valve assembly which precludes its use in thin structures, such as a wing.

The main object of the present invention is to provide a diverter valve assembly which uses less depth of installation than heretofore.

Another object is to provide such a valve assembly wherein the structure permits the pressure load to be offset from the pivot so that the doors have a positive torque acting on them in their closed position.

Another object is to provide a single unitary valve structure which turns as a whole requiring a minimum of linkage.

Another object is to provide such a valve assembly wherein the pivot for the unitary structure is located outside of each door and between the doors to form a single moving element.

Briefly stated, the present invention discloses a diverter valve assembly having a conduit with a branch passage to provide two outlets therefrom. A pair of spaced valve doors is located in the conduit at the branch and a member or strut joins the doors together to form a unitary movable structure. The unitary movable structure is rotated about a pivot which is disposed between the doors and is located downstream of the net pressure vector of the forces acting on the doors so that a positive torque is exerted on the doors in their closed positions as they are rotated to alternately open and close the outlets.

While the specification concludes with claims particularly pointing out and distinctly claiming the subject matter which is regarded as the invention, it is believed the invention will be better understood from the following description taken in connection with the accompanying drawing in which FIG. 1 is a partial cross-sectional view showing the spaced valve doors in a conduit in one position.

FIG. 2 is a view similar to FIGURE 1 showing the doors in their alternate closed position.

FIG. 3 is a cross-sectional view on the line 3—3 of FIGURE 2 of a typical linkage arrangement.

Referring first to FIGURE 1, the diverter valve assembly is shown as it might occur in either the diverted thrust or lift fan application of a VTOL aircraft in a well known manner as referenced in the aforementioned patents. The assembly preferably includes a straight conduit 10 for the passage of fluid therethrough which fluid, in the instant application intended, will be hot exhaust gases moving in the direction of the hollow arrows from a remote gas generator not shown. The conduit has an inlet 11 and is bifurcated to provide an outlet 12 and a second branch outlet 13 therefrom. In general application, outlet 12 will have the same centerline 14 as the inlet 11 and the two outlets 12 and 13 are arranged substantially 90° to each other as shown.

In order to direct exhaust gases entering inlet 11 alternately to outlets 12 and 13, there is provided a pair of valve doors 15 and 16 spaced throughout their length as shown and disposed in the conduit at the bifurcation. These valve doors are designed to rotate from the position shown in FIGURE 1 providing an exit for the gases through outlet 13 to the position shown in FIGURE 2, which is the straight-through position for exit of gases through outlet 12.

In the conventional arrangement, valve doors 15 and 16 have been pivoted about a line passing through the center of each door as illustrated in the above mentioned patents. This has necessitated a separate actuator for each door, linked for operation together, and a balancing of the pressure loads on each door in order to provide for the pressure load to pass as nearly as possible through the pivot point to prevent opening forces on the doors in the closed position and vice versa. Additionally, as may be seen in FIGURE 2 with respect to door 15, rotation about a pivot through the middle of the door requires a greater depth for the installation of the doors or, in other words, a lower arc of swing of the door 15 as shown by dotted line 17. The longer arc of swing is satisfactory providing the installation has the room to accommodate this arc but it is not the best arrangement where a shallow installation is required. Such installation might be found in the wing of a VTOL aircraft or in an installation where the space downstream of door 15 is desired for an exit cascade of conventional form.

Additionally, it will be apparent that the frontal area of the aircraft fuselage must be increased to accommodate the swing of the door through arc 17.

The present invention is designed to overcome these objectionable features by providing a unitary structure that will perform the same function in a shallower design and at the same time provide a positive torque on each door in its closed position. To this end, the doors 15 and 16 are not pivoted about their respective centers but are joined together by connecting members 18 which may be provided at both extremities of the doors and which, with the spaced doors 15 and 16 forms a unitary rigid box-like structure therewith permitting substantially unhindered flow between the doors at all times as shown. This unitary structure is rotated by any suitable means diagrammatically shown at 19 in FIGURE 3. To provide rotation, the whole structure is pivoted about a fixed pivot 20 which may act as a bearing and is located outside of each door and between the doors for a purpose to be described.

Referring to FIGURE 3, it can be seen that connecting member 18 may be any suitable link or strut which can be located conveniently in the sides of conduit 10 out of the main fluid flow although it is not necessary that it be so located and it could be a center airfoil strut as may be represented in FIGURES 1 and 2.

Referring to FIGURE 2, it can be seen that the unitary structure comprising doors 15, 16 and separate connecting member 18, when rotated about pivot 20, results in the trailing edge of doors 15 describing a much higher arc of swing 21 due to rotation about the new pivot point between the doors. This, of course, gains depth D shown in FIGURE 2 which may be used in a thin wing installation or for cutting down the frontal area of an aircraft or for the installation of an exit cascade within the same frontal area. In either case, it is a gain in space while the valve structure performs the same function.

It is to be noted that door 15 is preferably curved in the direction of the fluid flow through the branch outlet as shown to assist in turning the fluid at right angles for exit from outlet 13 whereas door 16 is flat to provide a minimum resistance to flow through outlet 12 when not blocking it. Again, flow also passes between the doors so that minimum resistance is provided.

In order to avoid any unbalanced opening forces on the doors when they are in the closed position and thereby ensure the doors remaining in position in the event of a linkage break or actuator failure, which could be disastrous in an aircraft, the pivot 20 is additionally specifically located. In any airfoil structure, which is the general shape of the butterfly doors 15 and 16, there is a center of pressure upon which the fluid that is being controlled will act. Normally, when the pivot is located at the center of the door, the center of pressure will be substantially coincidental therewith and the net force on the door in either the open or closed position would be zero. However, depending on the shape, this may not always be true and the doors may have an opening torque on them at all times requiring actuator force to hold the valve doors in the closed position. To prevent this, the instant invention additionally locates pivot 20 downstream of the net pressure vector of all the forces acting on the doors with the result that a positive torque is exerted on the doors in their closed positions at all times. Thus, any actuator failure or linkage break leaves the doors in the closed position.

This positive torque on door 16 may be best illustrated by reference to FIGURE 1. In the position shown in this figure the net effective pressure force, which is the sum of all the vector forces acting on the doors, is represented by vector 22 which exerts a clockwise moment about pivot 20 to provide a positive torque on door 16 in the closed position. Additionally, the pivot 20 is so located that in the closed position of door 15, as shown in FIGURE 2, the resultant vector 23 is upstream of the pivot so that a counterclockwise torque is exerted on door 15 to provide a positive torque on it in its closed position.

The structure described thus reduces the depth of installation with a smaller frontal area being required. It also provides a unitary structure with less complex linkage being a single moving unit to operate to the open and closed position. Also, it provides an important positive torque on each valve door in its closed position in the event of failure of the actuator or linkage structure. Notwithstanding the unitary structure, the doors may still be connected together by a suitable conventional linkage outside of the main airflow stream to reduce any obstruction to the fluid flow. It will be apparent that the particular door shapes of the valve doors 15 and 16 are not critical and may be varied in different installations but the connecting link and off-center pivoting arrangement is critical for the reasons discussed if the benefits are to be obtained.

While there has been described a preferred form of the invention, obviously modifications and variations are possible in light of the above teachings. It is therefore to be understood that within the scope of the appended claims, the invention may be practiced otherwise than as specifically described.

I claim:
1. A diverter valve assembly comprising,
   a conduct for the passage of fluid therethrough, and having an inlet,
      said conduit being bifurcated to provide two outlets therefrom,
   a pair of valve doors spaced from each other throughout their length to provide flow therebetween and disposed in the conduit at said bifurcation,
   a separate member joining said doors to form a unitary movable structure therewith,
   a fixed pivot connected to said separate member,
   means to rotate said structure as a unit so rotation of said doors and member together opens and closes said outlets alternately,
   said pivot connecting said member being disposed between said doors and downstream of the net pressure vector of all the forces acting on the doors,
   whereby a positive torque is exerted on said doors in their respective closed positions.

2. Apparatus as described in claim 1 wherein one of said outlets has substantially the same centerline as said inlet and the door blocking said one outlet is flat and said other door curves in the direction of said other outlet.

3. Apparatus as described in claim 1 wherein the two outlets are substantially 90° to each other.

4. A diverter valve assembly comprising,
   a substantially straight conduit for the passage of fluid therethrough,
   said conduit having an inlet and outlet,
   a second branch outlet directed substantially 90° from said straight conduit,
   a pair of valve doors spaced from each other throughout their length to provide flow therebetween and disposed in said conduit at said branch,
   a separate link connected to each door to form an integral structure therewith,
   a fixed pivot connected to said separate link and conduit so rotation of said doors and link together as a unit opens and closes said outlets alternately,
   said pivot connecting said link being disposed between said doors and downstream of the net pressure vector of all the forces acting on the doors,
   whereby a positive torque is exerted on said doors in their respective closed position and,
   means to rotate said doors.

5. Apparatus as described in claim 4 wherein said connecting link is disposed at the side of said conduit out of the main flow path.

6. Apparatus as described in claim 5 whereby the door controlling said outlet is flat and the door controlling said branch outlet is curved in the direction of said branch outlet.

References Cited by the Examiner

UNITED STATES PATENTS

| | | | |
|---|---|---|---|
| 142,569 | 9/1873 | Howell | 137—612 |
| 1,755,464 | 4/1930 | Williams | 137—612 |
| 2,244,986 | 6/1941 | Drane | 137—612 |
| 2,383,861 | 8/1945 | Hopkins | 137—608 X |
| 2,774,554 | 12/1956 | Ashwood et al. | 244—23 |
| 2,939,649 | 6/1960 | Shaw | 244—12 |
| 2,947,499 | 8/1960 | Douglas | 244—23 |
| 2,984,255 | 5/1961 | Katzenberger | 137—610 |
| 3,147,773 | 9/1964 | Matthews et al. | 137—637 |

FOREIGN PATENTS

| | | |
|---|---|---|
| 1,041,060 | 5/1953 | France. |
| 1,154,233 | 10/1957 | France. |
| 470,307 | 1/1929 | Germany. |
| 733,931 | 7/1955 | Great Britain. |

M. CARY NELSON, *Primary Examiner.*

LAVERNE D. GEIGER, *Examiner.*

S. SCOTT, *Assistant Examiner.*